UNITED STATES PATENT OFFICE.

KARL REINKING, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

DISCHARGING-PASTE AND PROCESS OF MAKING SAME.

No. 820,889.     Specification of Letters Patent.     Patented May 15, 1906.

Application filed January 31, 1905. Serial No. 243,589.

*To all whom it may concern:*

Be it known that I, KARL REINKING, a subject of the Prince Regent of Brunswick, residing at Ludwigshafen-on-the-Rhine, in the Kingdom of Bavaria, German Empire, have invented new and useful Improvements in Discharging-Pastes and Process of Preparing the Same, of which the following is a specification.

In the specification of Letters Patent No. 744,501 there is described the preparation of discharging-pastes containing hydrosulfites. These pastes, however, leave much to be desired with regard to their stability.

I have now discovered that discharging-pastes which are much more stable and which also possess an excellent discharging power can be obtained if in the preparation of such pastes a dry hydrosulfite which is free from water of crystallization be employed and at the same time sufficient concentrated salt solution be added, so that the hydrosulfite remains practically undissolved. The salts which can be employed in carrying out my invention are those which are readily soluble and which do not yield a precipitate of insoluble hydrosulfite of the metal present. The kind of salt employed is preferably selected with regard to the nature of the hydrosulfite used—for instance, when sodium hydrosulfite is employed it is most convenient to make use of sodium salts, such as sodium chlorid or sodium acetate; but other salts (for instance, chlorid of zinc and chlorid of calcium) can be employed, if desired. The stability of discharging-pastes prepared according to my invention is extremely good. For instance, textile fabrics printed with a paste in the preparation of which common salt and sodium hydrosulfite are employed can be dried for several hours at temperatures just below 100° centigrade without substantially lessening the power of the discharging material upon steaming. The additions to the discharging-pastes which are described in the specification of Letters Patent No. 744,501 can also be made to these new pastes, if desired.

The following example will serve to further illustrate the nature of my invention, which, however, is not confined to this example. The parts are by weight:

(*a*) Grind together to a very fine paste sixty (60) parts of hydrosulfit pure B. A. S. F. in powder, thirty-five (35) parts of glycerin, and five (5) parts of caustic-soda solution, (containing thirty-five (35) per cent. of NaOH.)

(*b*) Stir well together while warming equal parts of British gum thickening and a saturated solution of common salt.

In order to prepare, for example, a discharging-paste for parared, stir well together fifty (50) parts of the paste described under (*a*) with forty (40) parts of the thickening described under (*b*) and then bring the mixture to a consistency convenient for printing by the addition of ten (10) parts of a saturated solution of common salt.

For coloring-matters, which are more easily dischargeable than parared, the paste can be diluted by the addition of a larger quantity of the thickening described under (*b*) or else more of the saturated solution of common salt can be added. The discharge-paste is printed onto the material, which can then be treated as described in the above-mentioned specification of Letters Patent No. 744,501, or in any suitable manner.

Now what I claim is—

1. As a new article of manufacture a discharging-paste containing a hydrosulfite and also containing a hereinbefore-defined salt so that the hydrosulfite remains practically undissolved.

2. As a new article of manufacture a discharging-paste containing a hydrosulfite and also containing common salt, so that the hydrosulfite remains practically undissolved.

3. As a new article of manufacture a discharging-paste containing sodium hydrosulfite and also containing a hereinbefore-defined salt so that the hydrosulfite remains practically undissolved.

4. As a new article of manufacture a discharging-paste containing sodium hydrosulfite and also containing common salt so that the hydrosulfite remains practically undissolved.

5. As a new article of manufacture a discharging-paste containing a hydrosulfite and also containing a hereinbefore-defined salt so that the hydrosufite remains practically undissolved, glycerin, caustic-soda solution and British gum thickening.

6. As a new article of manufacture a discharging-paste containing sodium hydrosulfite and also containing common salt, so that the hydrosulfite remains practically undissolved, glycerin, caustic-soda solution and British gum thickening.

In testimony whereof I have hereunto set my hand in the presence of two subscribing witnesses.

KARL REINKING.

Witnesses:
J. ALEC. LLOYD,
JOS. H. LEUTE.